UNITED STATES PATENT OFFICE.

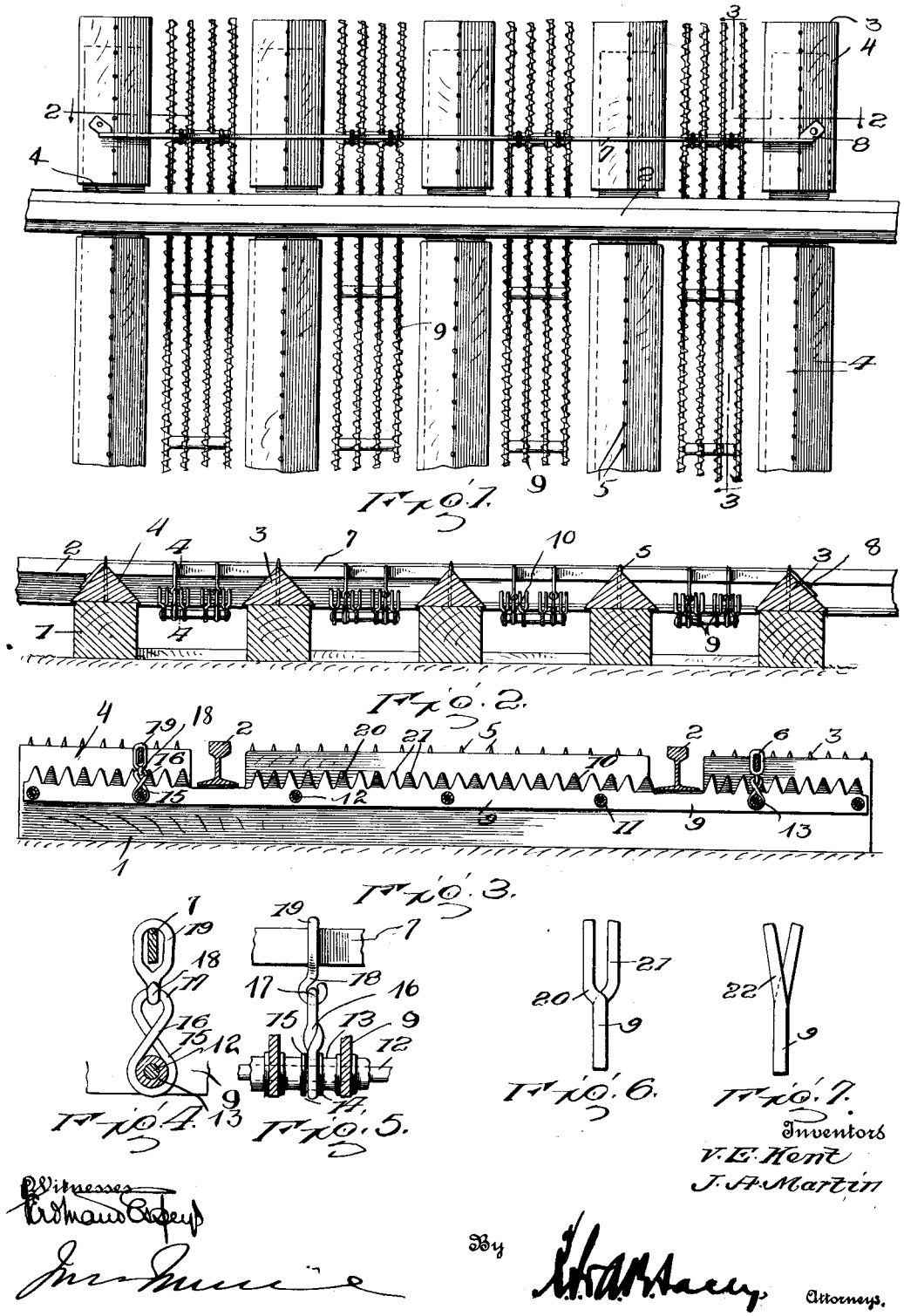

VICTOR E. KENT AND JAMES A. MARTIN, OF JOHNSON CITY, TENNESSEE.

CATTLE-GUARD.

1,102,057.  Specification of Letters Patent. Patented June 30, 1914.

Application filed February 12, 1913. Serial No. 748,018.

*To all whom it may concern:*

Be it known that we, VICTOR E. KENT and JAMES A. MARTIN, citizens of the United States, residing at Johnson City, in the county of Washington and State of Tennessee, have invented certain new and useful Improvements in Cattle-Guards, of which the following is a specification.

This invention relates to cattle guards and has as its object to provide a guard which will effectually prevent the passage of cattle from field to field, onto railway bridges, into tunnels, etc.

Another aim of the invention is to provide a cattle guard which will not be liable to get out of order nor be injured by cattle stepping thereon and which will not be liable to become clogged with dirt so as to prevent the performance of its function. The cattle guard embodying the present invention includes oscillatory guard sections which are suspended between fixed guard sections and one feature of the invention resides in the novel manner of constructing the guard sections, and another feature resides in the novel means employed for supporting the sections for oscillation.

As concerns the means provided for supporting the oscillatory sections, the invention aims to so construct and arrange the same that the sections will at all times be supported in proper position between the fixed sections of the guard.

Another aim of the invention is to so construct the oscillatory guard sections that they will possess a maximum tread-surface area, provided by a minimum amount of material.

Still further the invention aims to provide in a cattle guard an oscillatory section so constructed that it will present a maximum tread-surface area, although dirt falling on the guard will not be allowed to collect upon the tread-surface but will fall to the road-bed.

For a full understanding of the invention reference is to be had to the following description and accompanying drawings, in which:—

Figure 1 is a top plan view illustrating the guard embodying the present invention. Fig. 2 is a vertical section on the line 2—2 of Fig. 1. Fig. 3 is a section on the line 3—3 of Fig. 1. Fig. 4 is a vertical section on the line 4—4 of Fig. 2. Fig. 5 is a side elevation of the structure shown in Fig. 4. Fig. 6 is a detail end-view of one of the bars comprising the oscillatory guard-section. Fig. 7 is a view similar to Fig. 6, illustrating a slightly modified form of the bar.

Corresponding and like parts are referred to in the following description and indicated in all the views of the accompanying drawing by the same reference characters.

In the drawing, the ties upon which the cattle guard embodying the present invention is supported, are indicated by the numeral 1, and the rails supported by the ties are indicated at 2. The fixed sections of the guard are in the nature of wooden blocks, these blocks being indicated by the numeral 3 and being substantially triangular in cross-section so that each block has oppositely inclined upper faces which serve to prevent an animal securing foothold upon the said fixed guard-sections and also to direct the hoof of the animal onto the oscillatory guard-sections, which will be presently specifically described.

In order to further deter animals attempting to gain a foothold on the guard-sections 3, sharp pointed spikes 5 are driven into the said sections 3 through the base thereof and project at their pointed ends at the ridge of the respective block 3, the lower, or butt ends of the spikes 5 terminating at the base of the blocks. It will be observed by reference to Fig. 1 of the drawings that the blocks are arranged upon the ties between the rails 2 and also outwardly of each of the rails. Each of the fixed guard sections 3, which is located outwardly of either of the rails 2 is formed in its ridge with a notch 6 and disposed within the notches of the corresponding ones of these end members of the fixed guard sections and extending parallel to the adjacent rail 2, is a bar 7, the bar having its ends twisted, as at 8 and bolted or otherwise secured to the end ones of the series of such sections 3. These bars constitute the supports from which the oscillatory guard sections are suspended, as will now be explained. Each of the oscillatory guard-sections is made up of a number of bars 9 which have their upper edge portions cut to form teeth 10 and the said bars 9 are of a length substantially equal to the length of the ties 1 and it will be observed by reference to Fig. 3 of the drawing that the teeth 10 extend continuously at the upper edge of each bar except at points where the bars pass beneath the rails 2, the teeth of these bars being omitted so that free movement of the oscillatory guard sections beneath the rails will not be interfered with. The bars 9 are formed at intervals with openings 11 and the said bars 9 are arranged in sets and relatively long rivets 12 are fitted through the openings in the bars of each set and serve to secure the bars in assembled relation. As a means for spacing the bars of each set there are provided a number of spacing sleeves 13 which are fitted upon the rivets 12 between each two of the bars of each set in the manner clearly shown in Fig. 5 of the drawing. Each of the sleeves 13 which is located immediately outwardly of each rail is formed with spaced circumscribing beads 14 which receive between them one eye 15 of a twisted link 16.

By referring to Fig. 4, it will be observed that the links 16 may pivot upon the spacing sleeves 13 and that their eyes 15 and 17 are located in the same plane. The eye 17 of each link is engaged with the hook 18 of a clevis 19 which is fitted upon and suspended from the bar 7. In the drawing the bars comprising the oscillatory guard-sections are illustrated as arranged in sets of four, but it will be understood that a greater or less number may be employed in each section, and it will further be understood that while the spacing sleeves 13 with which the links 16 are engaged are the ones which are located between the inner and outer ones of the bars of each set, the links and spacing sleeves may be arranged in some other manner, if desired. An inspection of the drawing will also disclose the fact that the oscillatory guard - sections may swing transversely of the rails 2 or forwardly and rearwardly, due to the peculiar arrangement of the links 16, clevises 19 and spacing sleeves 13 and the manner in which these parts are connected together. The space between the bars of each movable guard-section is left unobstructed so that any dirt falling onto the sections will not lodge or collect upon the tread-surface thereof, but will fall to the roadbed. In order that the tread-surface may have a maximum area, the teeth 10 are alternately bent in opposite directions, either as shown in Fig. 6 or Fig. 7.

As shown in Fig. 6, the teeth are bent laterally at their lower ends, as at 20, and thence substantially vertically, as at 21, whereas in Fig. 7 they are bent at an angle, as at 22, so as to be inclined upwardly and away from each other.

Having thus described the invention what is claimed as new is:—

1. In a cattle guard, a supporting bar, an oscillatory guard-section including toothed bars, sleeves spacing the bars and provided with circumscribing spaced beads, a link engaged pivotally with the sleeves between their beads, and hook members on the supporting bars engaged by the said links.

2. In a cattle guard, a guard section including connected spaced bars having tread edges formed with teeth, the said teeth at their juncture with the bars being alternately offset laterally in opposite directions and the major portions of the teeth projecting upwardly in spaced relation with respect to each other and in parallelism.

In testimony whereof we affix our signatures in presence of two witnesses.

VICTOR E. KENT. [L. S.]
JAMES A. MARTIN.

Witnesses:
GORDON L. COX,
W. T. MARTIN.

Copies of this patent may be obtained for five cents each, by addressing the "Commissioner of Patents, Washington, D. C."